UNITED STATES PATENT OFFICE.

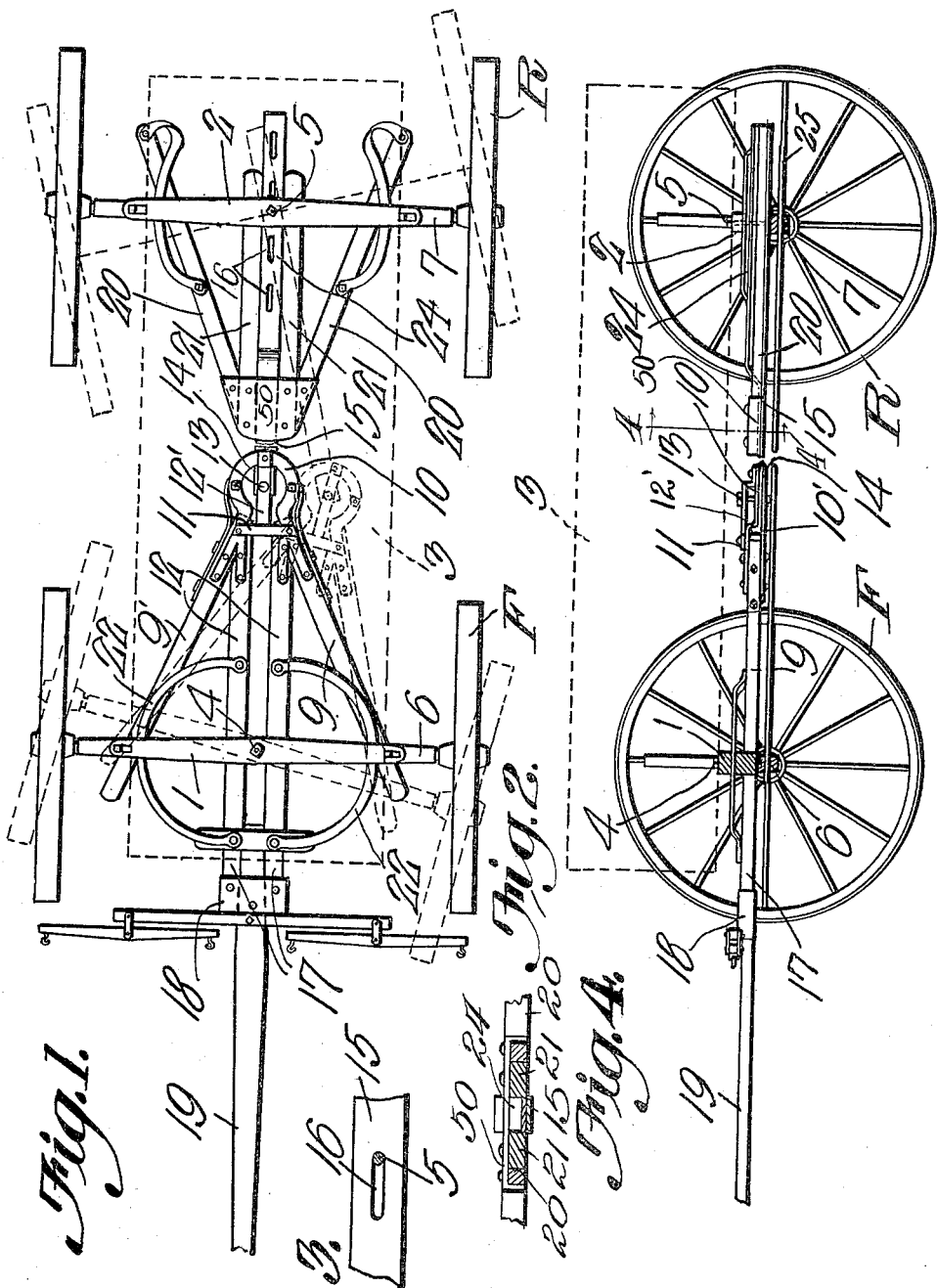

EMILIUS CHRISTIAN FERDINAND BECKER, OF LAURENS, SOUTH CAROLINA.

WAGON.

1,106,358.   Specification of Letters Patent.   Patented Aug. 11, 1914.

Application filed December 19, 1911. Serial No. 666,813.

*To all whom it may concern:*

Be it known that I, EMILIUS C. F. BECKER, a citizen of the United States, residing at Laurens, in the county of Laurens and State of South Carolina, have invented a new and useful Wagon, of which the following is a specification.

The present invention relates to improvements in short turning wagons.

An object of the present invention is to provide improvements in the construction of the wagon gear whereby the distance between the bolsters may be adjusted so as to accommodate a large or small wagon body, or the wagon may be used for the holding of lumber of different lengths.

A further object is to provide a short turning wagon with means whereby it will be impossible for the wheels to contact with the sides of the wagon body or lumber which is dispose upon the bolsters.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings—Figure 1 is a top plan view of a running gear, dotted lines showing the position of the wheels when turning and also the position the body will assume when placed upon the bolsters thereof. Fig. 2 is a side elevation taken from the left hand side of the wagon with the left wheels of the front and rear axles removed. Fig. 3 is a detail view of the auxiliary reach rod connection with the front axles. Fig. 4 is a cross sectional view taken on the line 4—4 of Fig. 2.

Referring to the drawings, the numeral 1 designates the forward bolster and 2 the rear bolster, which as shown in the drawings carries the body 3 although it is to be understood that lumber or any material desired to be hauled may be placed on the bolsters, the said bolsters being so constructed as to remain in the same parallel position at all times.

A king bolt 4 is passed through the forward bolster 1 while the king bolt 5 is passed through the rear bolster 2, and by means of the forward king bolt 4 the front axle 6 carrying the front wheels F, is pivotally connected to the same, while the rear axle 7 is pivotally connected by the king axle 5 to the rear bolster 2, said rear axle 7 carrying the rear wheels R.

A pair of rearwardly projecting and converging bars 9 and 9' are carried by the front axle 6 and are secured at their rear extremities to the parallel bars 12. The curved plates 10 and 10' are secured to the bars 9 and 9' and the bars 12 and are placed one above the other as clearly illustrated in Fig. 2. A transverse strap or cross bar 11 extends between the bars 12 and over and secured to the curved metallic plate 10. A plate 12' is carried by the transverse bar 11 and is secured to the upper curved metallic plate 10.

A central or pivot king bolt 13 is connected to the plate 12' centrally of the curved plates 10 and 10' and provides a pivotal connection for the end 14 of the auxiliary reach or bar 15, which as clearly shown in Fig. 3 is provided with elongated slots 16 therethrough for the slidable and removable reception of the king bolt 5 below the bolster 2 and above the rear axle 7. Thus the bars 12 are in reality a lever with the king bolt 4 as the fulcrum and provides a means whereby the desired motion or turning action is imparted from the front axle 6 to the rear axle 7.

Connected to the forward end 17 of the bars 12 by means of the connecting members 18 is the tongue 19. The curved metal plates 22 are connected to the said bars 12 and extend forwardly over the front axle 6.

Connected to the rear axle 7, are the rearwardly diverging bars 20 and parallel and spaced bars 21 which form a guide and support for the auxiliary reach or bar 15 and form the hounds of the rear portion of the running gear.

The auxiliary reach or bar 15 is provided with the reinforcing member secured thereto and through which extend a plurality of slots 16. The slots 16 extend through the auxiliary reach or bar 15 and the reinforcement 24 and allow for the adjustment of the said auxiliary reach.

A reach bar 25 of the usual construction is connected by the king bolts 4 and 5 to the front and rear axles respectively, and thus the distance between the front and rear axles is properly regulated, as is also the distance of movement of the short turning gear in making a turn. Also it is to be noted in this connection that the distance between the bolsters may be varied by substituting shorter or longer reach rods 25, the various slots 16 of the auxiliary reach being inserted over the king bolt 5. Also mention is made of the fact that as illustrated in Fig. 3, the slots 16 are of limited length and due to the fact that king bolt 5 will have limited movement therein the turning of the front and rear wheels will be accordingly limited so that the wheels will be prevented from cutting into the wagon body or material disposed upon and extending between the bolsters.

What is claimed is:—

In a wagon, the combination of front and rear wheel-carrying axles, bolsters therefor pivotally secured by king bolts thereto, converging bars rigidly secured to the front and rear axles and extending centrally of the running gear, upper and lower ring-shaped plates rigidly secured to the front converging arms, an auxiliary reach rod slidably disposed between the rear axle converging arms, said auxiliary reach rod provided with a plurality of long narrow slots of limited length, one of said slots receiving the rear king bolt therethrough, the front end of said reach rod pivotally secured to the front axle converging arms, a reach rod secured to the front and rear axles and holding the same in spaced relation, the limited slots of said auxiliary reach rod limiting the relative motions of said auxiliary reach rod and said rear axle.

In testimony that I claim the foregoing as my own, I have hereto affixed my signature in the presence of two witnesses.

EMILIUS CHRISTIAN FERDINAND BECKER.

Witnesses:
  H. DOUGLAS GREY,
  E. D. EASTERBY.

---

Copies of this patent may be obtained for five cents each, by addressing the "Commissioner of Patents, Washington, D. C."